US007021554B2

(12) United States Patent
Clark et al.

(10) Patent No.: US 7,021,554 B2

(45) Date of Patent: Apr. 4, 2006

(54) HEATING APPLIANCE

(75) Inventors: David Anthony Clark, Hugglescote (GB); James Robert Lowrie, Derby (GB); Heather Allderidge, Derby (GB)

(73) Assignee: Microgen Energy Limited, (GB)

( * ) Notice: Subject to any disclaimer, the term of this patent is extended or adjusted under 35 U.S.C. 154(b) by 104 days.

(21) Appl. No.: 10/488,459

(22) PCT Filed: Dec. 18, 2002

(86) PCT No.: PCT/GB02/05771

§ 371 (c)(1), (2), (4) Date: Mar. 3, 2004

(87) PCT Pub. No.: WO03/052327

PCT Pub. Date: Jun. 26, 2003

(65) Prior Publication Data

US 2005/0086935 A1 Apr. 28, 2005

(30) Foreign Application Priority Data

Dec. 19, 2001 (GB) .................................... 0130380

(51) Int. Cl.
*B60H 1/02* (2006.01)

(52) U.S. Cl. ....................... 237/12.1; 60/39.01; 60/624

(58) Field of Classification Search ............... 237/12.1; 60/39.01, 793, 624
See application file for complete search history.

(56) References Cited

U.S. PATENT DOCUMENTS 3,858,802 A * 1/1975 Stobart ...................... 237/12.1
4,277,021 A * 7/1981 Daye .......................... 237/56
4,657,290 A * 4/1987 Linden ......................... 290/2
4,731,547 A * 3/1988 Alenduff et al. .............. 307/85
4,736,111 A * 4/1988 Linden ......................... 290/2
4,996,841 A * 3/1991 Meijer et al. ................. 60/525
5,638,684 A * 6/1997 Siegel et al. ..................... 62/6
6,220,030 B1 4/2001 Clucas et al.
6,510,689 B1 * 1/2003 Budliger ...................... 60/517
6,701,721 B1 * 3/2004 Berchowitz ...................... 62/6

FOREIGN PATENT DOCUMENTS

DE 100 14 104 A 11/1991
DE 199 61 638 A1 6/2000
DE 199 36 591 C1 2/2001
EP 0 445 510 A2 9/1991
EP 1 160 520 A2 12/2001
WO WO 01/90656 11/2001

OTHER PUBLICATIONS

Parsons et al., "*Microgen—Cogeneration for the Home*", 1998 International Gas Research Conference.

* cited by examiner

*Primary Examiner*—Derek S. Boles
(74) *Attorney, Agent, or Firm*—Needle & Rosenberg, P.C.

(57) ABSTRACT

A domestic combined heat and power system comprising a Stirling engine (1) and water heater in the form of a supplementary burner (17). The exhaust gas from the Stirling engine is used to preheat combustible gas entering the Stirling engine and subsequently used to heat the water. The water heater (15) has a helical water duct (41) towards the periphery of a housing (39). Separate parts of this duct are heated, in series, by the exhaust gas from the Stirling engine and the supplementary burner (17) firing radially outwardly through the helical duct.

2 Claims, 3 Drawing Sheets

AIR
18
15
16
17
26
28
25
23
27
24
30
29
GAS
19
20
21
22
14
3
31
LFPSE
1

AIR
15
18
16
17
30
GAS
29
23
14
60
3
31
LFPSE
1

49
40
42
41

15
46
52
49
42
41
50
45
43
44
48
47
17
39
51
40

HEATING APPLIANCE

CROSS REFERENCE TO RELATED APPLICATIONS

The present application claims priority to Great Britain Application No. 0130380.9, filed Dec. 19, 2001, which application is incorporated herein fully by this reference.

The present invention relates to a heating appliance. In particular, the invention relates to a domestic combined heat and power (DCHP) unit.

Such DCHP units have been proposed which incorporate a Stirling engine connected to an alternator to generate electricity. The heat produced by the engine which would otherwise be wasted is used to heat water feeding the domestic water and central heating systems, and therefore becomes a valuable product of the DCHP system. It has been shown that the most favourable economics are achieved for the unit when the Stirling engine/alternator is sized to generate approximately 1 kW of electricity. At this level, however, only approximately 5 kW of heat will be provided, which is substantially below a typical domestic heat load of in excess of 20 kW.

In order to supply the remaining heat, so that the DCHP unit can compete effectively with the current specification of a domestic boiler, a supplementary gas burner is required. The present invention aims to provide a thermally efficient operation of the Stirling engine and supplementary burner.

According to the present invention there is provided a domestic combined heat and power assembly comprising a Stirling engine and a water heater wherein the Stirling engine is arranged to be heated by a first burner fed with combustible gas, the assembly further comprising an exhaust gas duct passing from the Stirling engine in contact with a combustible gas inlet into the first burner to preheat the combustible gas entering the first burner and subsequently heat water which is additionally heated by the water heater, wherein the water heater is provided is provided by a second burner, and wherein the system is arranged so that the exhaust gas and gas from the second burner form a combined stream once they have given up heat to the water and the combined stream is arranged to heat the water upstream of the exhaust gas.

Also, the water will receive relatively low grade heat from the combined stream, as the components of the combined stream have already give up some heat to the water. The water will subsequently receive relatively higher grade heat directly from the exhaust gas and from the supplementary burner. Such an arrangement is thermally efficient.

Preferably the system is arranged so that the exhaust gas and gas from the supplementary burner form a combined stream once they have given up heat to the water and the combined stream is arranged to heat the water upstream of the exhaust gas. With such an arrangement, the water will receive relatively low grade heat from the combined stream, as the components of the combined stream have already given up some heat to the water. The water will then subsequently receive relatively higher grade heat directly from the exhaust gas and from the supplementary burner. Such an arrangement is thermally efficient.

Preferably the system further comprises a Stirling engine cooler arranged to heat the water upstream of the exhaust gas heating. This not only serves to promote the heating of the water, but also helps to maintain the required temperature differential across the Stirling engine.

The burner gases heating the head of the Stirling engine are typically at around 1400° C. As the gases flow around the head, heat is transferred into the heater head, and the temperature of the gases falls to around 800° C. The gases transfer heat to the incoming fuel/air mixture. If there is no further heat recovery, the exhaust gases flowing into the Stirling engine flue then typically have a temperature of around 600° C.

The present invention also extends to a novel design of heating arrangement to transfer heat into the water. The requirements for this are that it is compact and is able to transfer heat from at least two streams into the water at maximum efficiency.

According to a further aspect of the present invention there is provided a heating arrangement for heating a fluid, the arrangement comprising a housing; a duct within the housing towards its outer periphery and helically wound about a central axis of the housing to convey the fluid from the first end of the housing to a second end of the housing; a supplementary burner in the housing adjacent to the second end and surrounded by the duct to transfer heat to the fluid in a first portion of the duct; an outlet for hot gas from an external heat source, the inlet being configured to direct the hot gas radially outwardly onto a second portion of the duct closer to the first end of the housing than is the first portion of the duct.

Such an arrangement is particularly compact as the supplementary burner and inlet for gas from an external source are within the duct through which the fluid is conveyed. Further, the supplementary burner and inlet are arranged to transfer heat to different parts of the helical duct. Thus, the arrangement can be set up to be particularly thermally efficient.

Preferably the inlet is arranged to substantially prevent mixing of the gas from the supplementary burner and the hot gas from the external heat source at least until both have passed through the helically wound duct. Thus the streams are substantially prevented from mixing prior to reaching the duct ensuring a more efficient heat transfer.

Once the exhaust gas and hot gas from the external source have passed through the helically wound duct, they may then simply be discharged either separately or as a combined stream. However, preferably, the two streams are formed into a combined stream once they have initially given up some heat to the duct, and the combined stream is passed around a third portion of the duct closer to the first end than is the second portion of the duct. Thus, the cool fluid in the helically wound duct which enters the first end of the housing initially encounters this relatively cool combined stream and is preheated by this stream before being heated by the gas from the external heat source and the gas from the supplementary burner.

Although some mixing of the gas from the supplementary burner and the hot gas from the external heat source is tolerable as a small amount of mixing will have relatively little effect on the overall heating of the fluid, it is preferable to minimise such mixing as much as possible. Therefore, preferably, a seal is provided to prevent mixing of gas from the supplementary burner and the hot gas from the external source radially inwardly of the duct.

In order to maximise the heat transfer to the duct, the duct is preferably arranged such that each coil of the duct is flattened in the direction of the central axis so that, in cross section, its radial dimension exceeds its axial dimension. Also, preferably, adjacent coils of the duct are closely adjacent to or abut one another. This ensures that the hot gas has to pass through a relatively long and narrow passageway between adjacent coils of the duct which makes for efficient heat transfer. This duct configuration is shown in WO 94/16272.

An example of the invention will now be described with reference to the accompanying drawings, in which.

Figure 1:
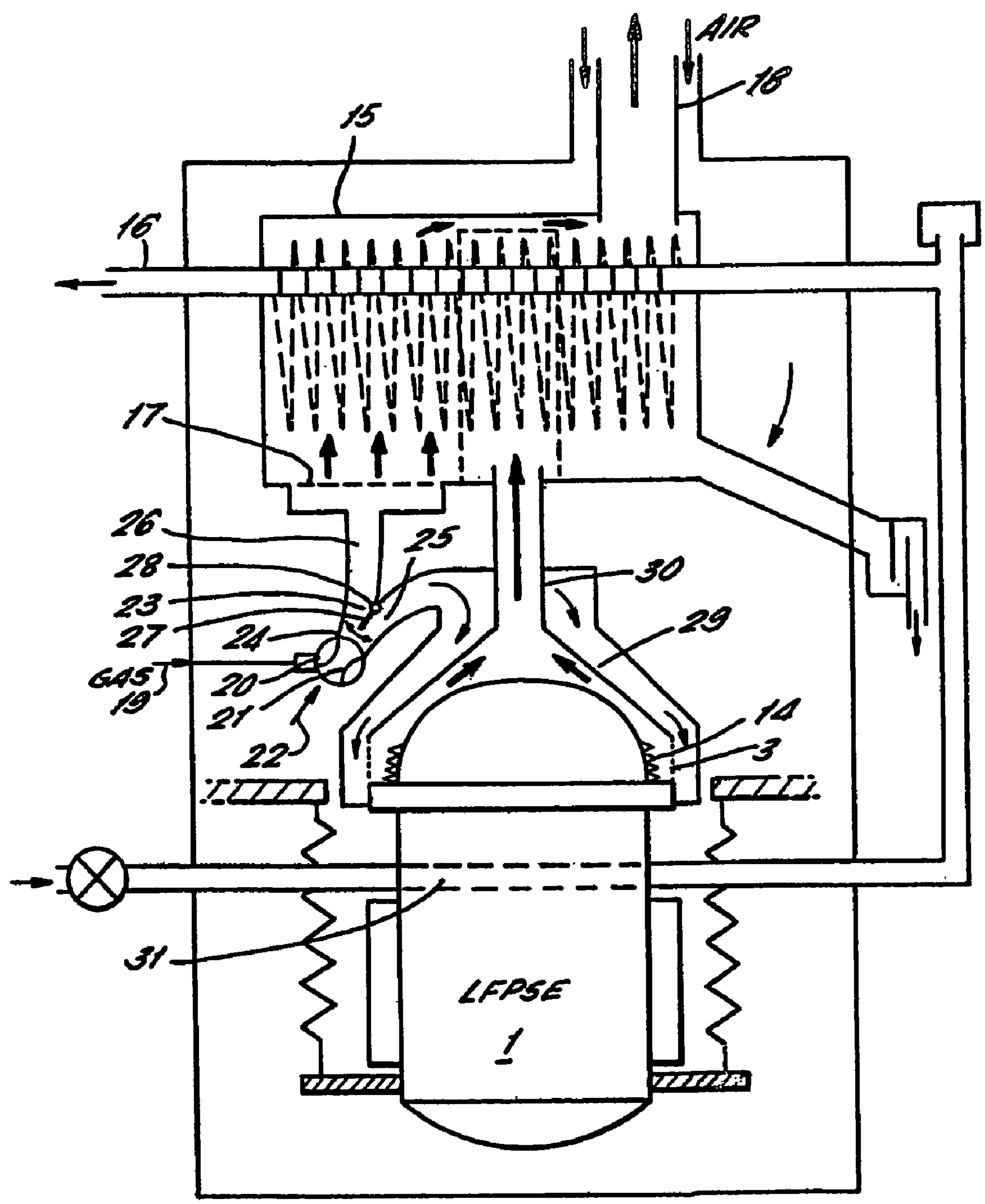
FIG. 1 is a schematic diagram showing the layout of a first Stirling engine system.

The arrangement shown in FIG. 1 comprises a Stirling engine 1 to which heat is supplied by a burner 14. The heat is transferred to the head by a system of fins 3 as disclosed in our earlier co-pending application no. 0020012 and exits through a flue.

The arrangement in FIG. 1 has a water heater 15 which is arranged to heat a water stream 16 by virtue of a supplementary burner 17. Exhaust gases are expelled through flue 18.

A common gas supply line 19 is provided for both the first 14 and supplementary 17 burners. This gas flow is controlled by a single multi-functional valve 20. The burner controls controlling ignition and flame detection of the burner may be incorporated into a multi-functional controller. Gas in the multi-functional valve 20 enters a mixing chamber in the form of a venturi manifold 21 and is mixed with an air stream 22 driven by a fan.

Figure 2:
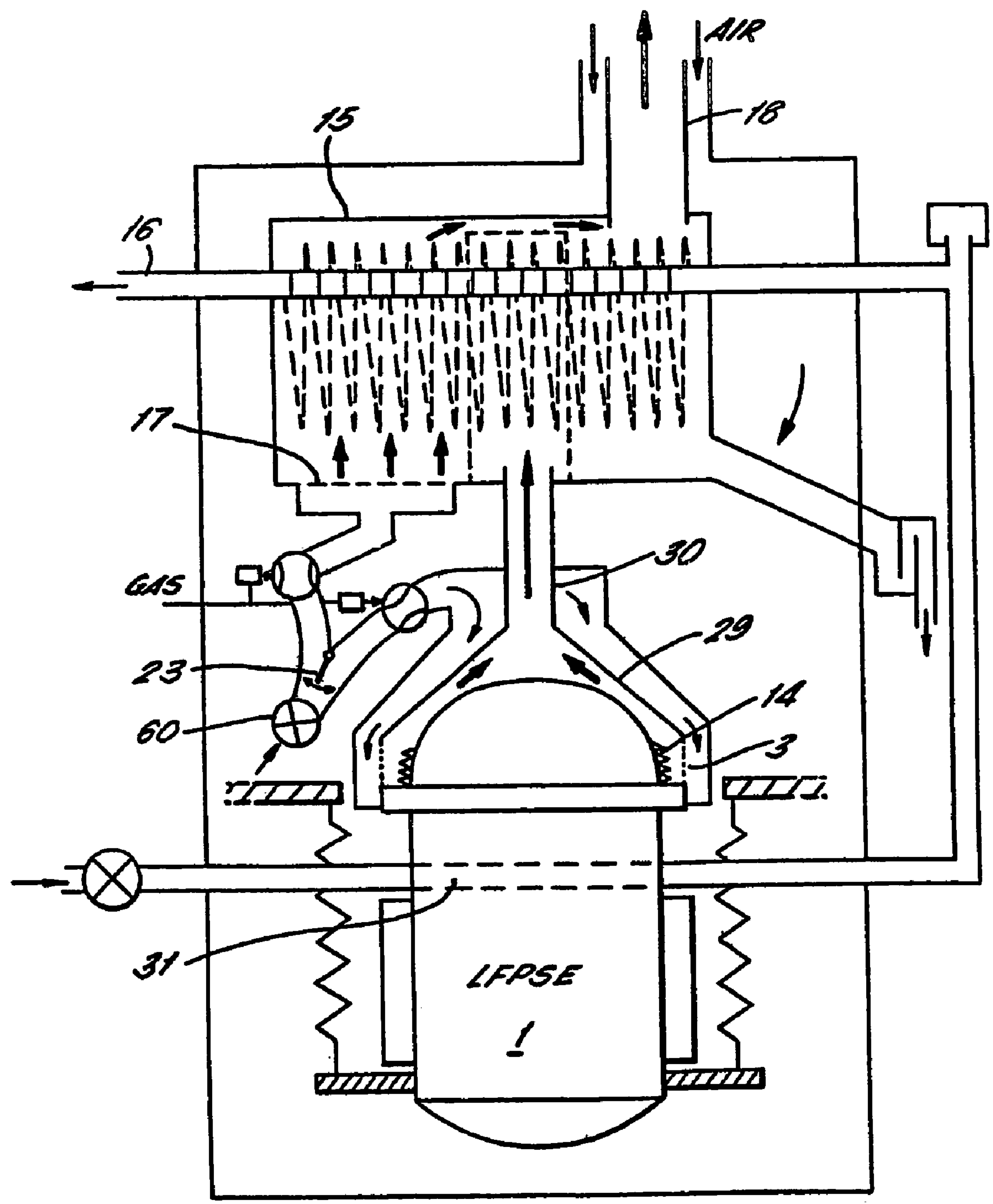
FIG. 2 is a schematic diagram showing the layout of a second Stirling engine system.

The gas and air mixture is now supplied to a splitter valve 23 in which one inlet 24 leads to a first burner outlet 25 and a second burner outlet 26. The relative amount of flow to each outlet is controlled by a flap valve 27 which is rotatable about an axis 28. The position of the flap valve 27 will be set by the appliance controller, and is driven to that position, for example, by a servo motor. Alternatively the air flow could be divided after a single intake fan 60, by such a splitter valve 23, and then each air stream could incorporate a multi-functional valve/controller to accurately meter the gas mixture to each burner. This arrangement is shown in FIG. 2.

The fuel/air mixture fed to the Stirling engine 1 flows around a cowling 29 enclosing the burner arrangement and is hence heated by the hot gas stream leaving the burner. The exhaust gas which has given up some of its heat to the incoming mixture leaves the cowling through manifold 30 and enters the water heater 15 where it comes into contact with the water stream 16 (which has already been heated to some extent in the Stirling engine cooler 31) so as to further preheat the water stream 16 upstream of the supplementary burner 17. The supplementary burner 17 is fired to provide supplementary heating to the water stream 16 if required. The exhaust gas from the first burner 14 leaves the water heater 15 with the exhaust gas from the supplementary burner 17 through flue 18.

Figure 4:
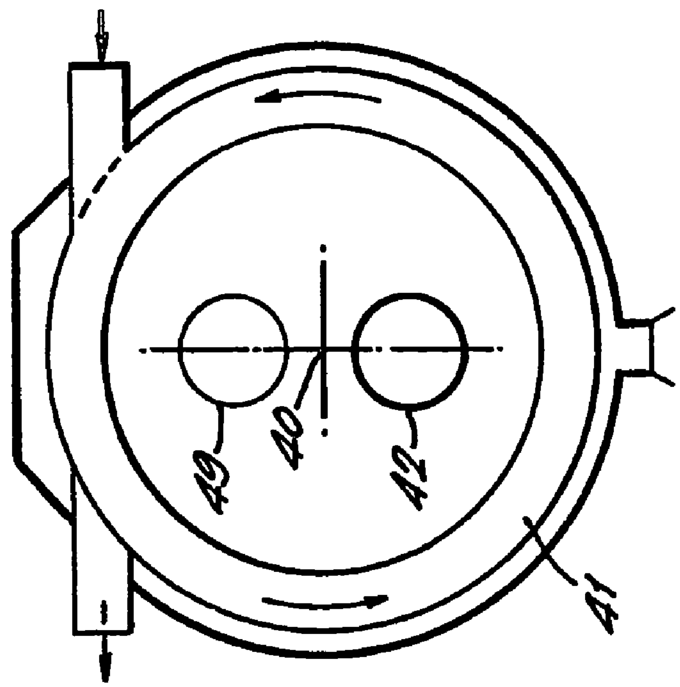
FIG. 4 is an end view of the arrangement of FIG. 3.
Figure 3:
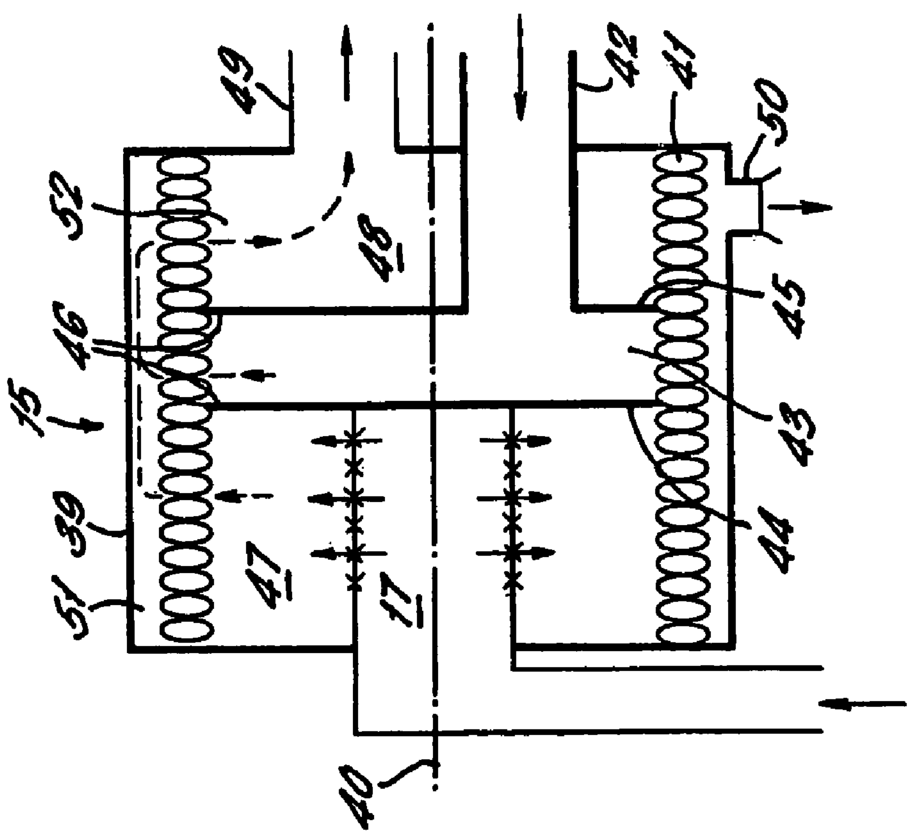
FIG. 3 is a cross-section through a heating arrangement.

The heating arrangement is shown in more detail in FIGS. 3 and 4 and comprises the supplementary burner 17 and water heater 15. The water heater 15 has a generally cylindrical housing 39 with a main axis 40. The supplementary burner 17 is positioned on the axis 40 so as to fire radially outwardly.

Water is fed through the water heater 15 from the right hand side of FIG. 3 to the left hand side around a water duct 41 Which is a single helical tube (which may be made up of a number of connected segments) wound around the axis 40 towards the outer periphery of the cylindrical housing 39. Each individual coil of the water duct 41 is flattened in the axial direction. Adjacent coils are positioned closely adjacent to one another, but are not sealed together such that hot gas can pass between adjacent coils. Extending towards the middle of the heater 15 is an inlet 42 for the exhaust gas from the Stirling engine. The inlet leads to a circular chamber 43 defined between two circular plates 44,45, the latter of which is an opening for the inlet 42. Annular brackets 46 bridge the gap between the edge of the plates 44,45 and the water duct 41 to ensure that all the exhaust gas from chamber 43 passes through the coils of the water duct 41. Towards the second end from the chamber 43 is a supplementary burner chamber 47 into which the supplementary burner 17 fires. The supplementary burner heats the adjacent coils towards the second end.

Towards the first end from the chamber 43 is a discharge chamber 48 with an outlet 49. There is also an outlet 50 for condensate produced due to the high efficiency nature of this final stage of heat recovery.

The operation of the water heater 15 is as follows. Water flows through the water duct 41 from the first end to the second end around a helical path. The supplementary burner 17 fires into chamber 47 and exhaust gas enters at inlet 42 and passes into chamber 43. These two hot streams pass radially through gaps between adjacent coils in the water duct 41 into an outer annular chamber 51 and form a combined stream. This combined stream then flows back through the water duct 41 adjacent to the first end as indicated by arrow 52. The incoming water is therefore initially heated by this combined stream. As it flows further towards the second end it encounters the Stirling engine exhaust gas from the chamber 43 and is heated further. Finally, it encounters the hot gas from the supplementary burner 17 to provide a third stage heating.

By providing this three stage heating arrangement, efficient heating of the water is provided. Further, as can be appreciated from FIG. 2, the arrangement in which this three stage heating is provided is particularly compact resulting in cost and space saving.

What is claimed is:

1. A domestic combined heat and power system comprising a Stirling engine and a water heater, wherein the Stirling engine is arranged to be heated by a first burner fed with a combustible gas, the assembly further comprising an exhaust gas duct passing from the Stirling engine in contact with a combustible gas inlet into the first burner to preheat combustible gas entering the first burner, and subsequently heat water which is subsequently heated by the water heater, wherein the water heater is provided by a second burner and wherein the system is arranged so that the exhaust gas and gas from the second burner form a combined stream once they have given up heat to the water and the combined stream is arranged to heat the water upstream of the exhaust.

2. A system according to claim 1, further comprising a Stirling engine cooler arranged to heat the water upstream of the exhaust gas heating.

* * * * *